(12) United States Patent
Kurata

(10) Patent No.: US 10,800,253 B2
(45) Date of Patent: Oct. 13, 2020

(54) ALL TERRAIN VEHICLE

(71) Applicant: HONDA MOTOR CO., LTD., Tokyo (JP)

(72) Inventor: Ko Kurata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/369,857

(22) Filed: Mar. 29, 2019

(65) Prior Publication Data

US 2019/0300094 A1 Oct. 3, 2019

(30) Foreign Application Priority Data

Apr. 2, 2018 (JP) .................................. 2018-071187

(51) Int. Cl.
| | | |
|---|---|---|
| *B60K 15/035* | (2006.01) | |
| *B62K 5/00* | (2013.01) | |
| *B62J 35/00* | (2006.01) | |
| *B62J 11/00* | (2020.01) | |
| *B62J 15/00* | (2006.01) | |

(52) U.S. Cl.
CPC ......... *B60K 15/03504* (2013.01); *B62J 11/00* (2013.01); *B62J 15/00* (2013.01); *B62J 35/00* (2013.01); *B62K 5/00* (2013.01)

(58) Field of Classification Search
CPC ...... B62K 5/00; B60K 15/03504; B62J 11/00; B62J 15/00; B62J 35/00
USPC ................................................. 180/291, 69.5
See application file for complete search history.

(56) References Cited

U.S. PATENT DOCUMENTS

| | | | |
|---|---|---|---|
| 8,448,737 B2 * | 5/2013 | Hasegawa | ................ B62J 35/00 180/219 |
| 9,809,110 B2 | 11/2017 | Nakamura et al. | |
| 10,502,164 B2 * | 12/2019 | Hamamura | ................ F01P 3/18 |
| 10,539,097 B2 * | 1/2020 | Kurata | ............. B60K 15/03504 |
| 2010/0224172 A1 | 9/2010 | Kusa | |
| 2017/0089303 A1 | 3/2017 | Kurata et al. | |
| 2017/0159617 A1 | 6/2017 | Hamamura et al. | |

(Continued)

FOREIGN PATENT DOCUMENTS

| | | |
|---|---|---|
| JP | 2-212282 A | 8/1990 |
| JP | 2005-69505 A | 3/2006 |
| JP | 2010-203313 A | 9/2010 |

(Continued)

*Primary Examiner* — John D Walters
(74) *Attorney, Agent, or Firm* — Birch, Stewart, Kolasch & Birch, LLP

(57) ABSTRACT

An all terrain vehicle includes: an internal combustion engine; a fuel tank; a body frame on which to mount the engine and tank; at least three wheels suspended at the frame and including at least paired left and right wheels; and a canister adsorbing evaporated fuel in the tank. Part of a body cover includes: a vertical wall extending up-down while covering a specified wheel from one of front and rear sides; an upper wall covering the specified wheel from above, extending forward and rearward, and spaced toward an other of the front and rear sides from the vertical wall; and a connection wall inclined while interconnecting an end portion on the vertical wall side of the upper wall and an upper end of the vertical wall. An accommodation space triangular in side view is formed between the connection wall and specified wheel. The canister is disposed in the space.

10 Claims, 9 Drawing Sheets

(56) References Cited

U.S. PATENT DOCUMENTS

2017/0334285 A1    11/2017    Tanaka

FOREIGN PATENT DOCUMENTS

| JP | 2017-65413 A | 4/2017 |
| JP | 2017-105286 A | 6/2017 |
| JP | 2017-210032 A | 11/2017 |

* cited by examiner

ALL TERRAIN VEHICLE

BACKGROUND OF THE INVENTION

Field of the Invention

The present invention relates to an all terrain vehicle comprising an internal combustion engine disposed rearwardly of a steering mechanism, a fuel tank that reserves fuel which is to be supplied to the internal combustion engine, the fuel tank being disposed above the internal combustion engine, a body frame on which to mount the internal combustion engine and the fuel tank, at least three wheels that are suspended at a front portion and a rear portion of the body frame and include at least a pair of left and right wheels, and a canister for adsorption of evaporated fuel generated in the fuel tank.

Description of the Related Art

Japanese Patent Application Laid-open No. 2010-203313 has made known an all terrain vehicle in which a canister for adsorbing evaporated fuel generated in a fuel tank is attached to a body frame on a front side of a steering mechanism.

SUMMARY OF THE INVENTION

Meanwhile, the fuel tank and the internal combustion engine are supported by the body frame on the rear side relative to the steering mechanism. In a configuration in which the canister is disposed on the front side of the steering mechanism as disclosed in Japanese Patent Application Laid-open No. 2010-203313, an enlargement of the canister in size makes it difficult to secure a space for disposing the canister on the front side of the steering mechanism. Thus, it is desired to enhance the degree of freedom in layout of the canister.

The present invention has been made in consideration of the above-mentioned circumstances. It is therefore an object of the present invention to provide an all terrain vehicle in which the degree of freedom in layout of a canister is enhanced.

In order to achieve the object, according to a first aspect of the present invention, there is provided an all terrain vehicle comprising an internal combustion engine disposed rearwardly of a steering mechanism, a fuel tank that reserves fuel which is to be supplied to the internal combustion engine, the fuel tank being disposed above the internal combustion engine, a body frame on which to mount the internal combustion engine and the fuel tank, at least three wheels that are suspended at a front portion and a rear portion of the body frame and include at least a pair of left and right wheels, and a canister for adsorption of evaporated fuel generated in the fuel tank, wherein part of a body cover covering at least the body frame, the internal combustion engine and the wheels includes a vertical wall that extends in an up-down direction while covering a specified wheel of the at least three wheels from either one of front and rear sides, an upper wall that extends in a front-rear direction while covering the specified wheel from above and is disposed to be spaced toward an other of the front and rear sides from the vertical wall, and a connection wall that is inclined while interconnecting an end portion on the vertical wall side of the upper wall and an upper end of the vertical wall, and an accommodation space having a triangular shape as seen in side view is formed between the connection wall and the specified wheel, and the canister is disposed in the accommodation space.

According to the first aspect of the present invention, part of the body cover includes the vertical wall extending in the up-down direction while covering the specified wheel from either one of the front and rear sides, the upper wall extending in the front-rear direction while covering the specified wheel from above, and the connection wall which is inclined while interconnecting the end portion on the vertical wall side of the upper wall and the upper end of the vertical wall. In addition, the canister is disposed in the accommodation space that is disposed between the connection wall and the specified wheel and that has a triangular shape as seen in side view. Therefore, with the canister disposed while effectively utilizing the space between a corner portion configuring part of the body cover and the specified wheel, the degree of freedom in layout of the canister can be enhanced, while setting the layout position of the canister to be comparatively high and thereby enhancing protection property.

According to a second aspect of the present invention, in addition to the first aspect, a metallic label is fixed to an upper surface of the connection wall.

According to the second aspect of the present invention, the metallic label is fixed to the upper surface of the connection wall. Therefore, with the canister disposed while utilizing the space on the back side of the label, a comparatively wide space can be used as a layout space for the canister, which makes it possible to cope with an enlargement of the canister in size. Besides, with direct sunlight intercepted by the metallic label and the connection wall, a rise in the temperature of the canister due to direct sunlight can be restrained, and adsorption efficiency for the evaporated fuel can be enhanced.

According to a third aspect of the present invention, in addition to the second aspect, the accommodation space as seen in side view is formed by the connection wall an opposite vertical wall section that extends in the up-down direction while being opposed to the connection wall from the other of the front and rear sides, and a bottom wall section that extends in the front-rear direction while being opposed to the connection wall from below, and the canister is attached to the opposite vertical wall section or the bottom wall section in such a posture that a longitudinal direction of the canister is along a vehicle width direction.

According to the third aspect of the present invention, the canister accommodation space as seen in side view is formed by the connection wall, the opposite vertical wall section and the bottom wall section, and the canister with its longitudinal direction set along the vehicle width direction is attached to the opposite vertical wall section or the bottom wall section. Therefore, a space for disposing the canister which is long in the vehicle width direction can be easily secured, and layout spaces for the connection pipes provided at both end portions of the longitudinal direction of the canister can also be easily secured.

According to a fourth aspect of the present invention, in addition to the second or third aspect, a box-shaped case having a pair of left and right side wall sections in addition to the opposite vertical wall section and the bottom wall section is attached to the body cover while forming the accommodation space between the case and the connection wall, and at least part of a selected wall section of the opposite vertical wall section, the bottom wall section and the side wall sections can be attached to and detached from the case.

According to the fourth aspect of the present invention, part of the box-shaped case attached to the body cover while forming the accommodation space between the case and the connection wall can be attached and detached. By this, attachment and detachment of the canister can be facilitated, and maintainability can be thereby enhanced, while covering the canister by the case to thereby enhance external appearance quality.

According to a fifth aspect of the present invention, in addition to the fourth aspect, the case is detachably attached to the body cover.

According to the fifth aspect of the present invention, the case is detachably attached to the body cover. Therefore, the case can be attached to and detached from the body cover together with the canister, whereby maintainability can be further enhanced.

According to a sixth aspect of the present invention, in addition to the second aspect, the specified wheel is the front wheel that is steered, and a fender covering the front wheel includes the vertical wall, the upper wall and the connection wall.

According to the sixth aspect of the present invention, the canister is disposed on the back surface side of the fender which covers the front wheel as a steered wheel. Therefore, the back surface of the fender can be largely exposed to the exterior by steering, and maintainability can be secured while securing external appearance quality.

According to a seventh aspect of the present invention, in addition to the sixth aspect, the fuel tank has an oil feeder port disposed at a position deviated toward one of left and right sides from a center in a vehicle width direction of the fuel tank, the canister is disposed on a side where one of a pair of left and right fenders as said fender is provided, and an end portion, on a side opposite to the canister, of a conduit is disposed in a vicinity of the oil feeder port, the conduit introducing outside air into the canister.

According to the seventh aspect of the present invention, the oil feeder port is located at a position deviated toward one of the left and right sides from the center in the vehicle width direction of the fuel tank, and the end portion, on the side opposite to the canister, of the conduit that is disposed on the side where one of the pair of left and right fenders is provided, the conduit introducing outside air into the canister is disposed in the vicinity of the oil feeder port. Therefore, with the canister disposed at a position near the oil feeder port, it is possible to realize a piping layout in which the length of the piping concerned to the canister is shortened.

According to an eighth aspect of the present invention, in addition to the seventh aspect, an other of the pair of left and right fenders is provided with a glove box.

According to the eighth aspect of the present invention, the fender on the side opposite, in the left-right direction, to the side on which the canister is provided is provided with the glove box. Therefore, maintainability of the canister can be secured, while disposing the label and the glove box at such a position as to be easily visible to the rider.

Note that the front fender 21 in the embodiments corresponds to the fender in the present invention, and the outside air introduction hose 57 in the embodiments corresponds to the conduit in the present invention.

The above and other objects, characteristics and advantages of the present invention will be clear from detailed descriptions of the preferred embodiments which will be provided below while referring to the attached drawings.

DESCRIPTION OF THE PREFERRED EMBODIMENTS

Figure 1:
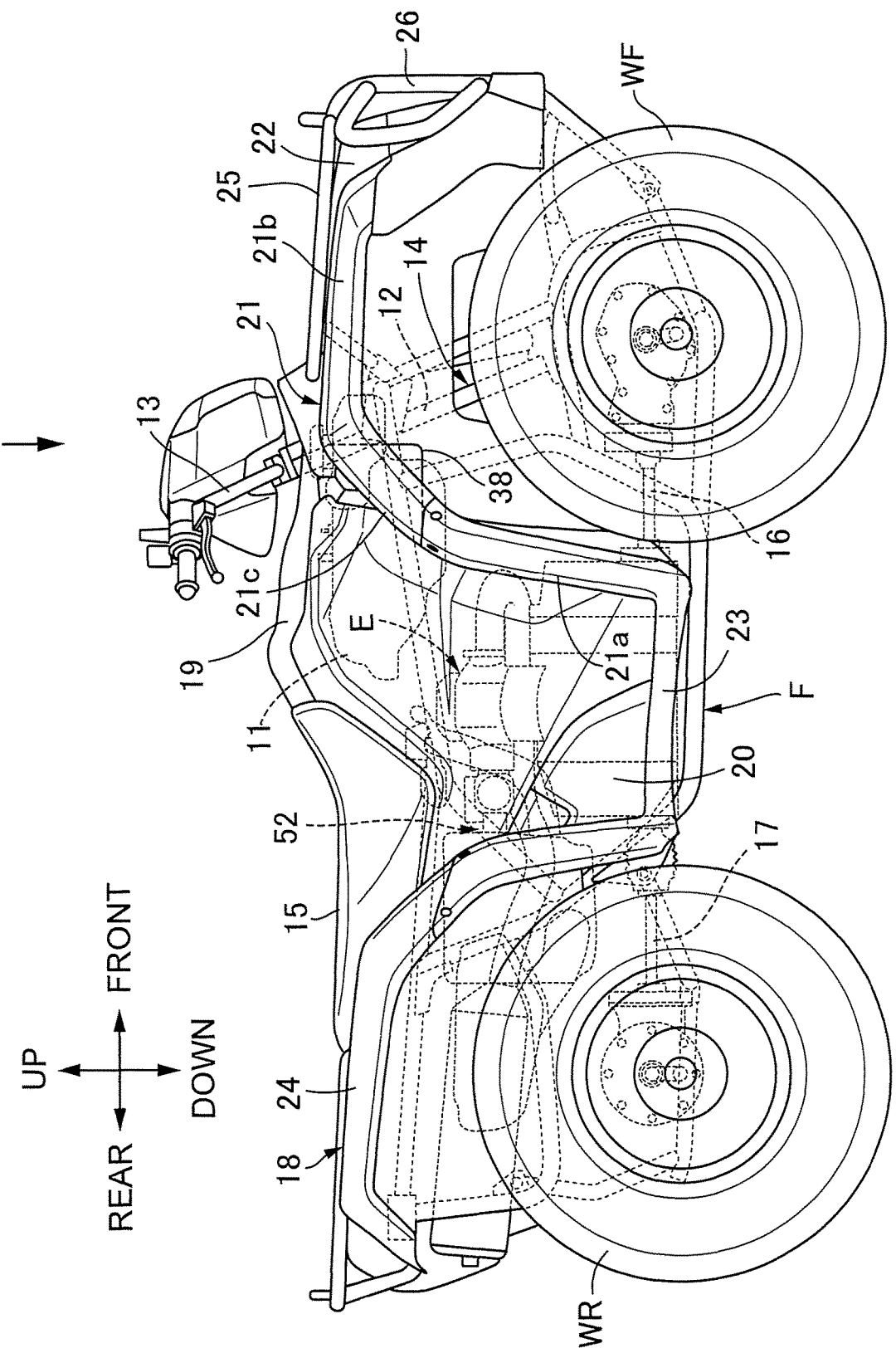
FIG. 1 is a right side view of an all terrain vehicle according to a first embodiment.

Embodiments of the present invention will be described below, referring to the attached drawings. In the following description reference numbers corresponding to components of exemplary embodiments are included only for ease of understanding, but the applicant's claims are not limited to the exemplary embodiments or to specific components of the exemplary embodiments. Note that directions of up and down, front and rear, and left and right in the following description are the directions as viewed from a rider riding an all terrain vehicle.

A first embodiment of the present invention will be described referring to FIGS. 1 to 8. First, in FIGS. 1 to 3, a body frame F of this all terrain vehicle includes a plurality of frame members welded and connected to one another, the frame members including a plurality of metallic pipes. An internal combustion engine E and a fuel tank 11 that reserves fuel to be supplied to the internal combustion engine E and that is disposed above the internal combustion engine E are mounted on the body frame F.

At least three wheels including a pair of left and right wheels are suspended at a front portion and a rear portion of the body frame F. In the present embodiment, a pair of left and right front wheels WF as steered wheels are suspended at front portions of the body frame F through an independent suspension type front suspension (not depicted), and a pair of left and right rear wheels WR are suspended at rear portions of the body frame F through an independent suspension type rear suspension (not depicted). In other words, in the present embodiment, a total of four wheels including the pair of left and right front wheels WF and the pair of left and right rear wheels WR are suspended from the body frame F.

A steering shaft 12 inclined rearwardly upward is rotatably supported on a central portion in a vehicle width direction of a front portion of the body frame F, and a bar-shaped steering handle 13 is attached to an upper end portion of the steering shaft 12. A steering mechanism 14 is configured with the steering shaft 12 and steering arms (not depicted) connected to the steering shaft 12, the steering arms being also connected to the front wheels WF via tie rods (not depicted), and the left and right front wheels WF are steered by an operation of the steering handle 13.

The internal combustion engine E is mounted on the body frame F such as to be disposed rearwardly of the steering mechanism 14, and the fuel tank 11 disposed above the internal combustion engine E is supported on the body frame F. Besides, a riding seat 15 disposed above the internal combustion engine E and rearwardly of the fuel tank 11 is supported on the body frame F.

The internal combustion engine E is for producing power for driving the pair of left and right front wheels WF and the pair of left and right rear wheels WR. A front drive shaft 16 for driving the pair of left and right front wheels WF is extended forward from the internal combustion engine E, and a rear drive shaft 17 for driving the pair of left and right rear wheels WR is extended rearward from the internal combustion engine E.

Figure 4:
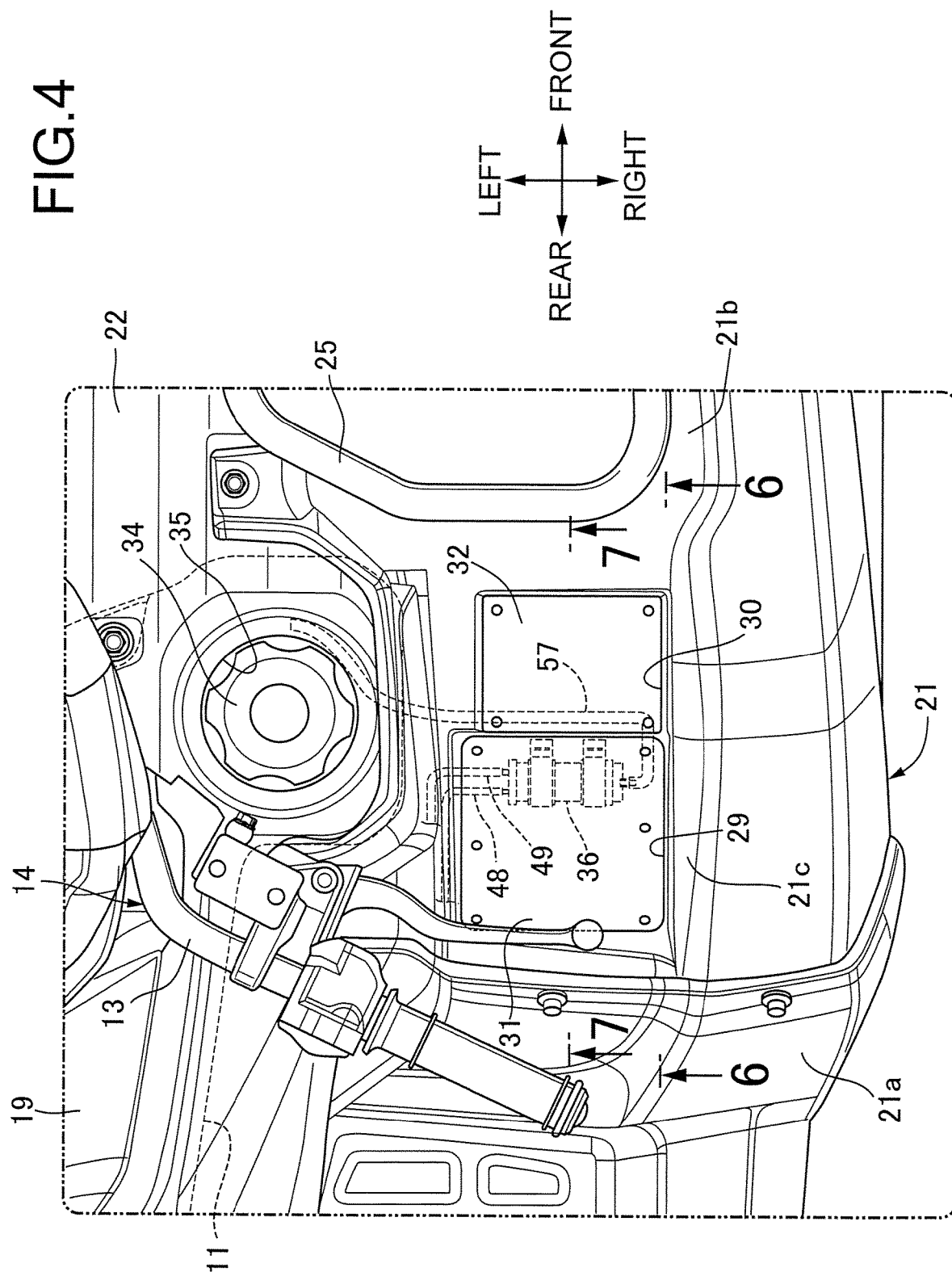
FIG. 4 is an enlarged view of a part indicated by arrow 4 of FIG. 3.

Referring to FIG. 4 also, at least the body frame F, the internal combustion engine E, the front wheels WF and the rear wheels WR are covered by a body cover 18. In the present embodiment, the body cover 18 is formed in such a manner as to cover the fuel tank 11 in addition to the body frame F, the internal combustion engine E, the front wheels WF and the rear wheels WR.

The body cover 18 includes: a tank cover 19 disposed at a position for covering the fuel tank 11 from above; a pair of left and right side covers 20 disposed at positions for being continuous with both left and right sides of the tank cover 19 and covering the internal combustion engine E from lateral sides; a pair of left and right front fenders 21 disposed at positions for respectively covering the pair of left and right front wheels WF; a front cover 22 disposed at a position for interconnecting the pair of left and right front fenders 21; a pair of left and right steps 23 continuous with lower end portions of the side covers 20 and rear end lower portions of the front fenders 21 in such a manner that feet of the rider seated on the riding seat 15 are placed thereon; and a pair of left and right rear fenders 24 disposed at positions for being continuous with rear end portions of the side covers 20 and rear end portions of the steps 23 and respectively covering the pair of left and right rear wheels WR. The body frame F is wholly covered with the body cover 18.

A front carrier 25 is disposed above front portions of the left and right front fenders 21 and the front cover 22. The front carrier 25 is provided in connection with a front protector 26 which covers the front fenders 21 and the front cover 22 from the front side and is attached to a front end portion of the body frame F.

The front fender 21 configuring part of the body cover 18 includes: a vertical wall 21a that extends in the up-down direction while covering the right-side front wheel WF, which is a specified wheel among the pair of left and right front wheels WF and the pair of left and right rear wheels WR, from one of the front and rear sides (in the present embodiment, from the rear side); an upper wall 21b that extends in the front-rear direction while covering the right-side front wheel WF from above and that is disposed to be spaced toward the other of the front and rear sides (in the present embodiment, toward the front side) from the vertical wall 21a; and a connection wall 21c that is inclined while interconnecting an end portion on the vertical wall 21a side of the upper wall 21b and an upper end of the vertical wall 21a.

The connection wall 21c of the right-side front fender 21 of the pair of left and right front fenders 21 is formed with a rectangular first recess 29 recessed downward, and the upper wall 21b of the right-side front fender 21 is formed with a rectangular second recess 30 recessed downward in connection with the first recess 29.

A metallic first label 31 to be accommodated in the first recess 29 is fixed, for example, by riveting, to an upper surface of the connection wall 21c of the right-side front fender 21. A metallic second label 32 to be accommodated in the second recess 30 is fixed, for example, by riveting, to an upper surface of the upper wall 21b of the right-side front fender 21.

For example, a plurality of signs for calling the rider's attention are represented on the first label 31, whereas for example, an age restriction with respect to driving of an all terrain vehicle is represented on the second label 32.

Figure 3:
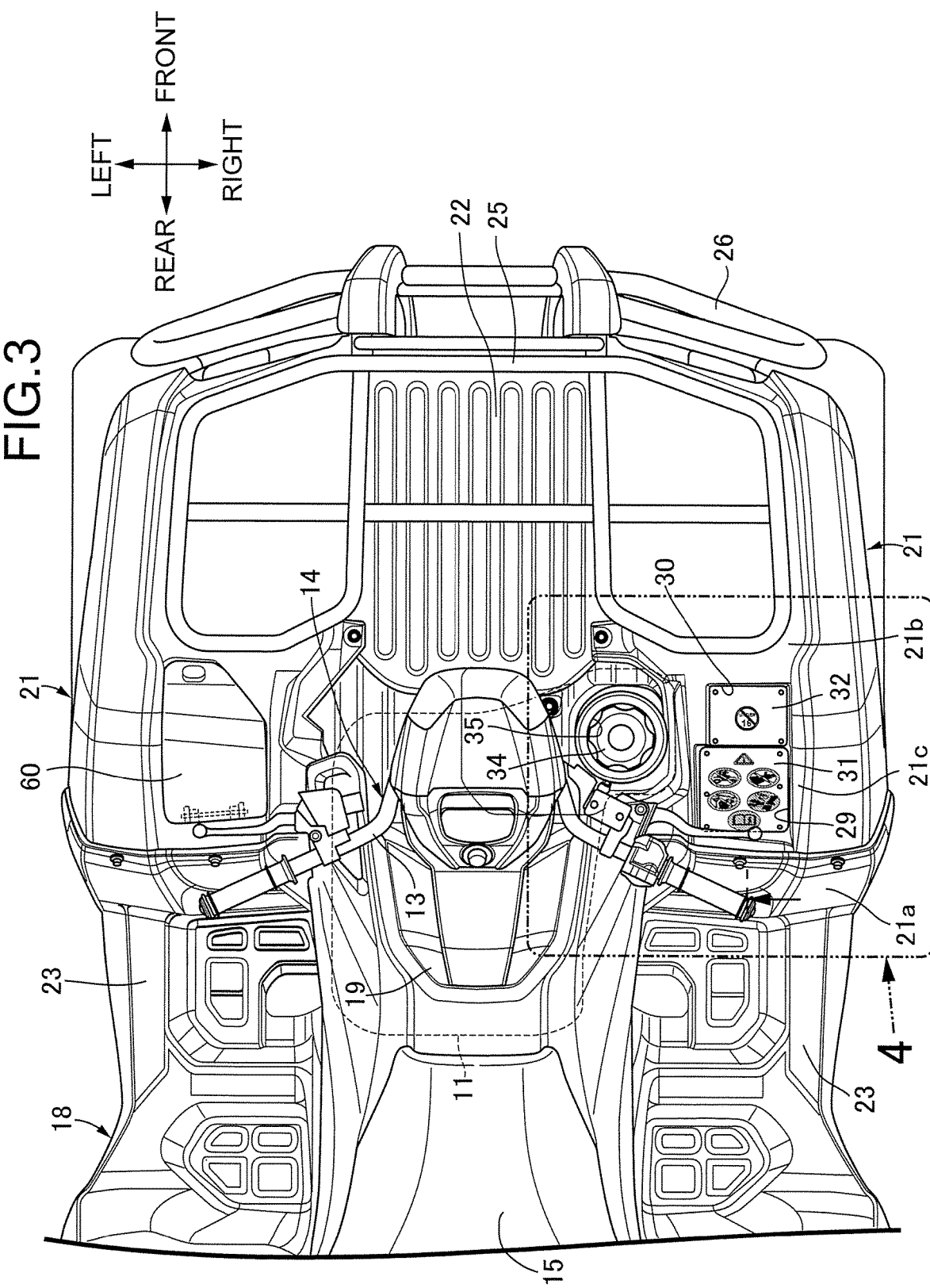
FIG. 3 is a plan view from arrow 3 of FIG. 1.
Figure 5:
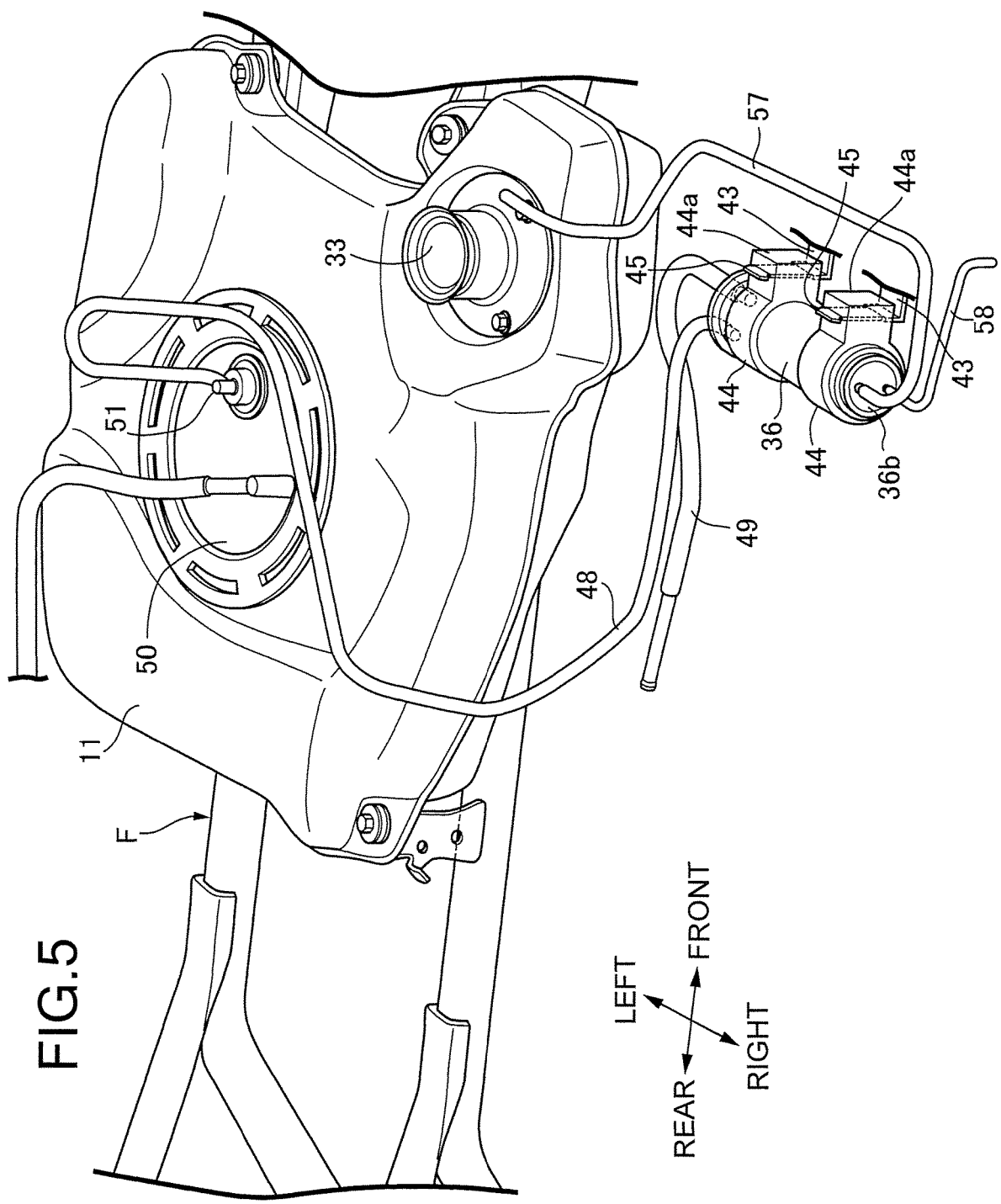
FIG. 5 is a perspective view of a fuel tank and a canister.

In FIG. 5, the fuel tank 11 has an oil feeder port 33 disposed at a position deviated toward a front portion on one of the left and right sides (in the embodiment, on the right side) from the center in the vehicle width direction of the fuel tank 11. The oil feeder port 33 is closed with a detachable oil feeder cap 34 (see FIGS. 3 and 4). Moreover, the tank cover 19 is formed with a circular through-hole 35 for permitting the oil feeder port 33 and the oil feeder cap 34 to face the outside, as depicted in FIGS. 3 and 4.

Figure 6:
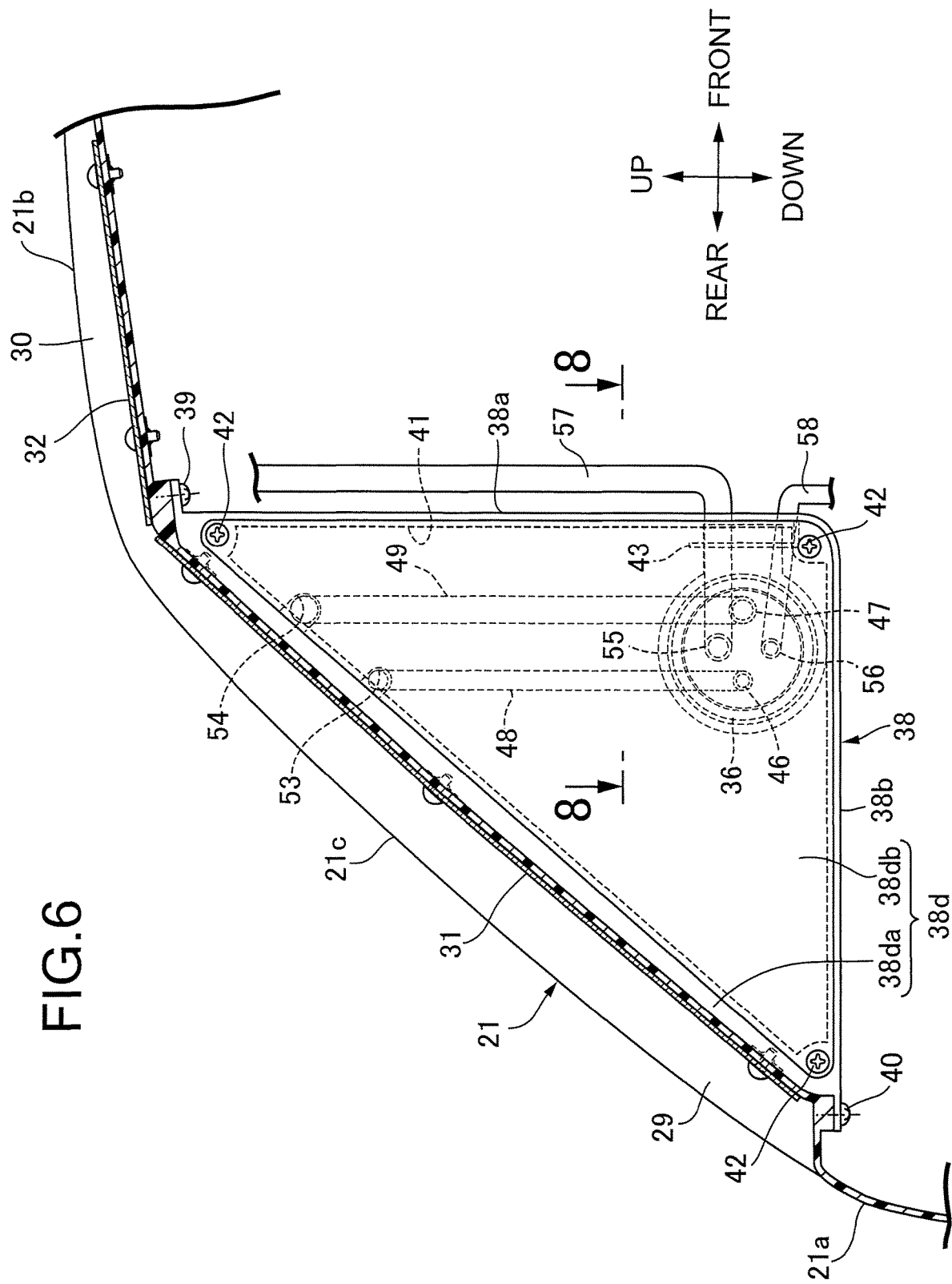
FIG. 6 is a sectional view taken along line 6-6 of FIG. 4.
Figure 7:
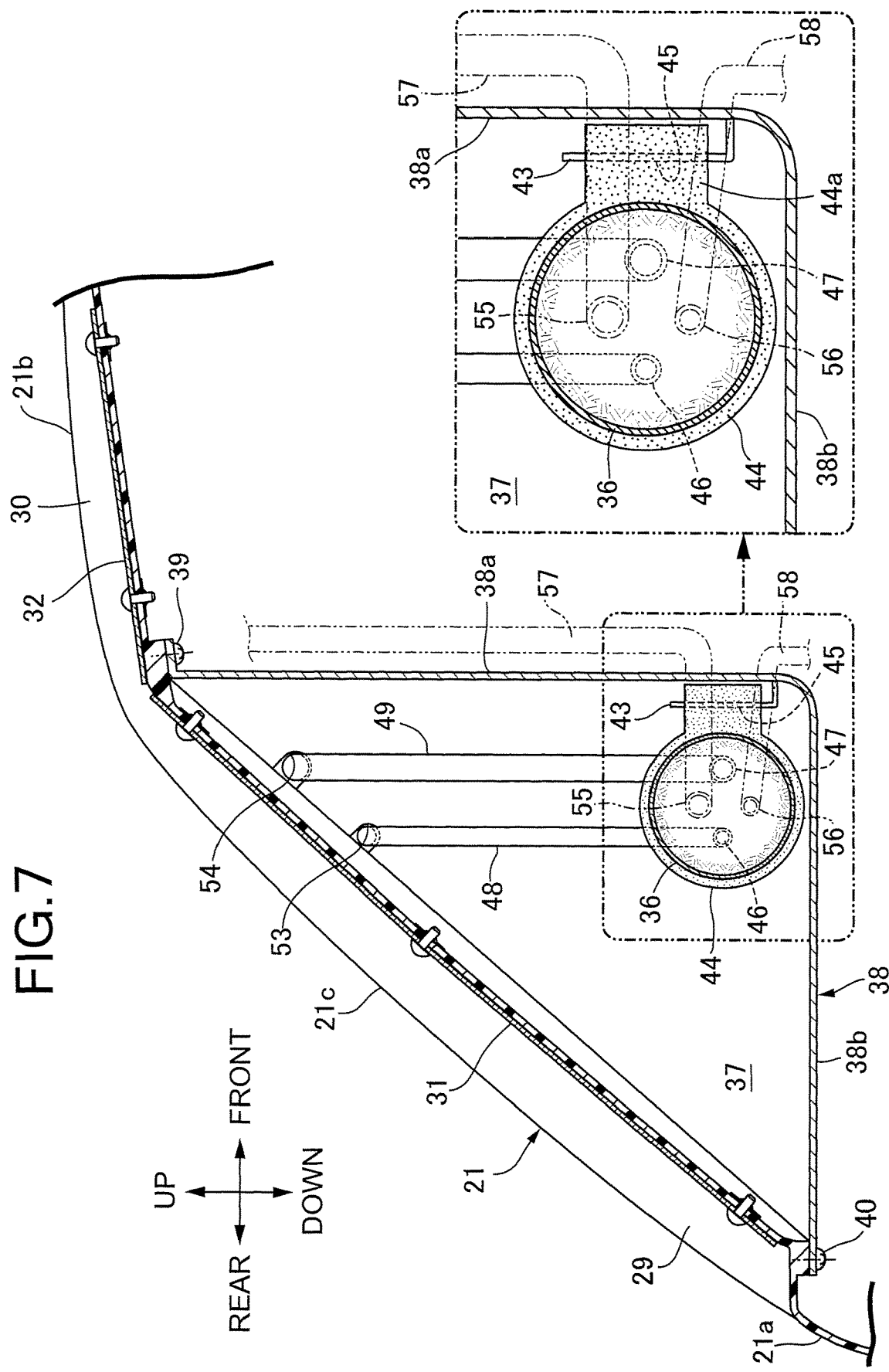
FIG. 7 is a sectional view taken along line 7-7 of FIG. 4.

Referring to FIGS. 6 and 7 also, evaporated fuel generated in the fuel tank 11 is adsorbed by a canister 36. The canister 36 is disposed in an accommodation space 37 which is formed between the connection wall 21c of the right-side front fender 21 and the right-side front wheel WF and has a triangular shape as seen in side view.

The accommodation space 37 as seen in side view is formed by the connection wall 21c of the right-side front fender 21, an opposite vertical wall section 38a extending in the up-down direction while being opposed to the connection wall 21c from the other of the front and rear sides (in the present embodiment, from the front side), and a bottom wall section 38b extending in the front-rear direction while being opposed to the connection wall 21c from below and being continuous, for example, at a right angle, with a lower end portion of the opposite vertical wall section 38a.

Figure 8:
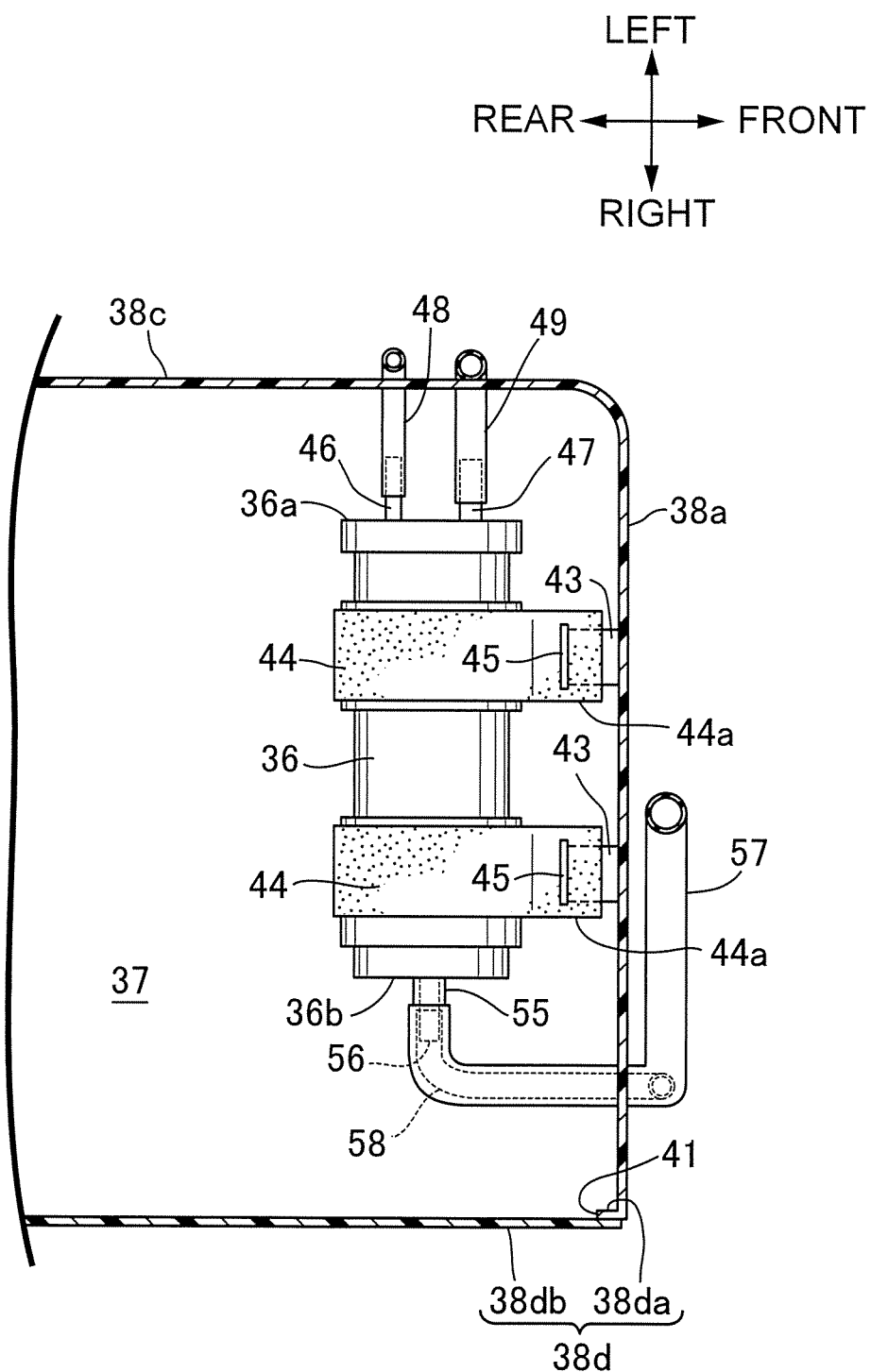
FIG. 8 is a sectional view taken along line 8-8 of FIG. 6.

Referring to FIG. 8 also, a box-shaped case 38 having a pair of left and right side wall sections 38c and 38d continuous with both left and right side ends of the opposite vertical wall section 38a and both left and right side ends of the bottom wall section 38b, in addition to the opposite vertical wall section 38a and the bottom wall section 38b, is attached to the right-side front fender 21 of the body cover 18 in such a manner as to form the accommodation space 37 between the case 38 and the connection wall 21c. In the present embodiment, an upper end portion of the opposite vertical wall section 38a of the case 38 is fastened to a rear end portion lower surface of the upper wall 21b of the right-side front fender 21 by a plurality of first screw members 39, whereas a rear end portion of the bottom wall section 38b of the case 38 is fastened to a lower portion lower surface of the connection wall 21c of the right-side front fender 21 by a plurality of second screw members 40, and the case 38 is detachably attached to the right-side front fender 21.

At least part of a selected wall section of the opposite vertical wall section 38a, the bottom wall section 38b and the side wall sections 38c and 38d of the case 38 can be attached to and detached from the case 38. In the present embodiment, the right-side side wall section 38d of the left and right side wall sections 38c and 38d includes a frame portion 38da provided in integral connection with the opposite vertical wall section 38a and the bottom wall section 38b while having a substantially triangular opening 41, and a lid portion 38db fastened to the frame portion 38da by third screw members 42 disposed, for example, at three positions in such a manner as to close the opening 41. The lid portion 38db can be attached to and detached from the case 38.

The canister 36 is attached to the opposite vertical wall section 38a or the bottom wall section 38b in such a posture that the longitudinal direction of the canister 36 is along the vehicle width direction. In the present embodiment, the canister 36 is attached to the opposite vertical wall section 38a. A pair of substantially L-shaped hooks 43 disposed with a spacing therebetween in the left-right direction are provided on an inner surface of the opposite vertical wall section 38a. On the other hand, ring-shaped rubbers 44 surrounding the canister 36 are attached to the canister 36, and the hooks 43 are inserted into slits 45 formed in projections 44a integrally projectingly provided on the rubbers 44, whereby the canister 36 is attached to the opposite vertical wall section 38a.

Meanwhile, a charging connection pipe 46 and a purging connection pipe 47 are projectingly provided on an end wall 36a on the inner side in the vehicle width direction of the canister 36, whose longitudinal direction is set along the vehicle width direction, in such a manner as to be opposed to the left-side side wall section 38c of the case 38.

A charging hose 48 whose one end portion is continuous with the charging connection pipe 46 penetrates the left-side side wall section 38c, and is extended between the fuel tank 11 and the tank cover 19 from the right-side front fender 21 to a central portion of the fuel tank 11. In addition, a circular support plate 50 for supporting a fuel pump (not depicted) disposed in the fuel tank 11 is attached to an upper surface central portion of the fuel tank 11, and the other end portion of the charging hose 48 is connected to an evaporated fuel connection pipe 51 provided at the support plate 50 such as to guide the evaporated fuel in the fuel tank 11 and projecting upward.

Besides, a purging hose 49 whose one end portion is continuous with the purging connection pipe 47 penetrates the left-side side wall section 38c, and is extended from the right-side front fender 21 to the internal combustion engine E side through the inside of the side cover 20. The other end portion of the purging hose 49 is connected to an intake system 52 (see FIGS. 1 and 2) of the internal combustion engine E.

Moreover, an upper end of the left-side side wall section 38c of the case 38 is formed with cutouts 53 and 54 for forming through-holes for permitting penetration therethrough of the charging hose 48 and the purging hose 49, between the upper end and a lower surface of the connection wall 21c of the right-side front fender 21.

In addition, an outside air introduction connection pipe 55 and a drain connection pipe 56 are projectingly provided at an end wall 36b on the outer side in the vehicle width direction of the canister 36, while being opposed to the right-side side wall section 38d of the case 38. An outside air introduction hose 57 as a conduit for introducing outside air into the canister 36 penetrates the opposite vertical wall section 38a of the case 38, while one end portion of the outside air introduction hose 57 is connected with the outside air introduction connection pipe 55, the outside air introduction hose 57 being extended between the fuel tank 11 and the tank cover 19 along an outer surface of the case 38 from the right-side front fender 21 to the vicinity of the oil feeder port 33 of the fuel tank 11. That is, an end portion, on the side opposite to the canister 36, of the outside air introduction hose 57 is disposed in the vicinity of the oil feeder port 33 while being covered by the tank cover 19 from above at a peripheral edge portion of the through-hole 35. Besides, a drain hose 58 whose one end portion is in connection with the drain connection pipe 56 penetrates the opposite vertical wall section 38a of the case 38, and opened downward in front of the case 38.

Figure 2:
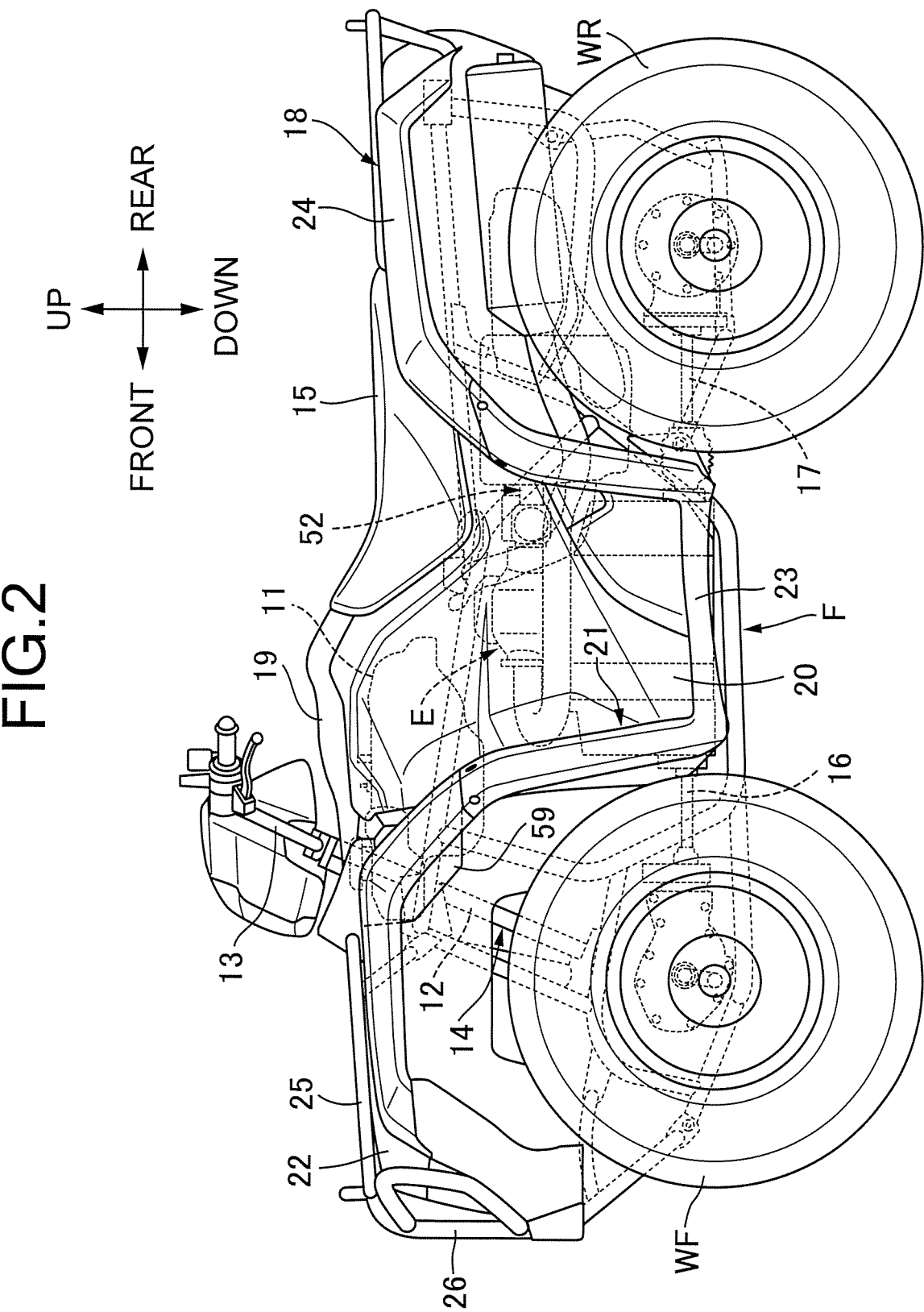
FIG. 2 is a left side view of the all terrain vehicle.

Meanwhile, the canister 36 is disposed on the side where one of the pair of left and right front fenders 21, the right-side front fender 21 in the present embodiment, is provided. On the other hand, as depicted in FIG. 2, the front fender 21 on the other of the left and right sides, that is, the left-side front fender 21 is provided with a glove box 59 projecting downward from the left-side front fender 21. A lid member 60 for closing the glove box 59 from above is attached to the left-side front fender 21 in an openable and closable manner.

An operation of the first embodiment will be described below. The right-side front fender 21 as part of the body cover 18 that covers at least the body frame F, the internal combustion engine E, the pair of left and right front wheels WF and the pair of left and right rear wheels WR includes: the vertical wall 21a that extends in the up-down direction while covering the right-side front wheel WF, which is a specified wheel of the wheels disposed in a left-right pair, from the rear side; the upper wall 21b that extends in the front-rear direction while covering the right-side front wheel WF from above and that is disposed to be spaced toward the front side from the vertical wall 21a; and the connection wall 21c that is inclined while interconnecting the end portion on the vertical wall 21a side of the upper wall 21b and the upper end of the vertical wall 21a. The accommodation space 37 having a triangular shape as seen in side view is formed between the connection wall 21c and the specified wheel, and the canister 36 is disposed in the accommodation space 37. Therefore, the canister 36 is disposed while effectively utilizing the space between a corner portion of the right-side front fender 21 configuring part of the body cover 18 and the right-side front wheel WF, whereby the degree of freedom in layout of the canister 36 can be enhanced while setting the layout position of the canister 36 to be comparatively high, thereby enhancing protection property.

In addition, the metallic first label 31 is fixed to the upper surface of the connection wall 21c of the right-side front fender 21. Therefore, the canister 36 is disposed while utilizing the space on the back side of the first label 31, whereby a comparatively wide space is used as a layout space for the canister 36, which makes it possible to cope with an enlargement of the canister 36 in size. In addition, direct sunlight is intercepted by the metallic first label 32 and the connection wall 21c, whereby a rise in the temperature of the canister 36 due to direct sunlight can be restrained, and adsorption efficiency for the evaporated fuel can be enhanced.

Besides, the accommodation space 37 as seen in side view is formed by the connection wall 21c, the opposite vertical wall section 38a extending in the up-down direction while being opposed to the connection wall 21c from the front side, and the bottom wall section 38b extending in the front-rear direction while being opposed to the connection wall 21c from below. In addition, the canister 36 is attached to the opposite vertical wall section 38a in such a posture that the longitudinal direction of the canister 36 is along the vehicle width direction. Therefore, it is possible to easily secure a space for disposing the canister 36 which is long in the vehicle width direction, and to easily secure a layout space for the charging connection pipe 46, the purging connection pipe 47, the outside air introduction connection pipe 55 and the drain connection pipe 56 which are provided at both end portions in the longitudinal direction of the canister 36.

In addition, the box-shaped case 38 having the pair of left and right side wall sections 38c and 38d in addition to the opposite vertical wall section 38a and the bottom wall section 38b is attached to the right-side front fender 21 of the body cover 18 while forming the accommodation space 37 between the case 38 and the connection wall 21c. In addition, at least part of a selected wall section among the opposite vertical wall section 38a, the bottom wall section 38b and the side wall sections 38c and 38d, in the present embodiment, the lid portion 38db as part of the right-side side wall section 38d, can be attached to and detached from the case 38. For this reason, while covering the canister 36 by the case 38 to thereby enhance external appearance quality, it is possible to facilitate attachment and detachment of the canister 36, thereby enhancing maintainability.

Besides, the case 38 is detachably attached to the right-side front fender 21 of the body cover 18. Therefore, the case 38 can be attached to and detached from the right-side front fender 21 together with the canister 36, whereby maintainability can be further enhanced.

In addition, the right-side front fender 21 covering the right-side front wheel WF that is steered includes the vertical wall 21a, the upper wall 21b and the connection wall 21c. Therefore, the back surface of the right-side front fender 21 can be largely exposed to the outside by steering, so that maintainability can be secured while securing external appearance quality.

Besides, the fuel tank 11 has the oil feeder port 33 disposed at a position deviated toward one of the left and right sides (in the present embodiment, toward the right side) from the center in the vehicle width direction of the fuel tank 11, the canister 36 is disposed on the side (in the present embodiment, on the right side) where one of the pair of left and right front fenders 21 is provided, and an end portion, on the side opposite to the canister 36, of the outside air introduction hose 57 for introducing outside air into the canister 36 is disposed in the vicinity of the oil feeder port 33. For this reason, with the canister 36 disposed at a position near the oil feeder port 33, it is possible to realize a piping layout in which the length of a piping concerned to the canister 36 is shortened.

Further, the other of the pair of left and right front fenders 21 (in the present embodiment, the left-side front fender 21) is provided with the glove box 59. Therefore, maintainability of the canister 36 can be secured, while disposing the first and second labels 31 and 32 and the glove box 59 at such positions that they are easily visible to the rider.

Figure 9:
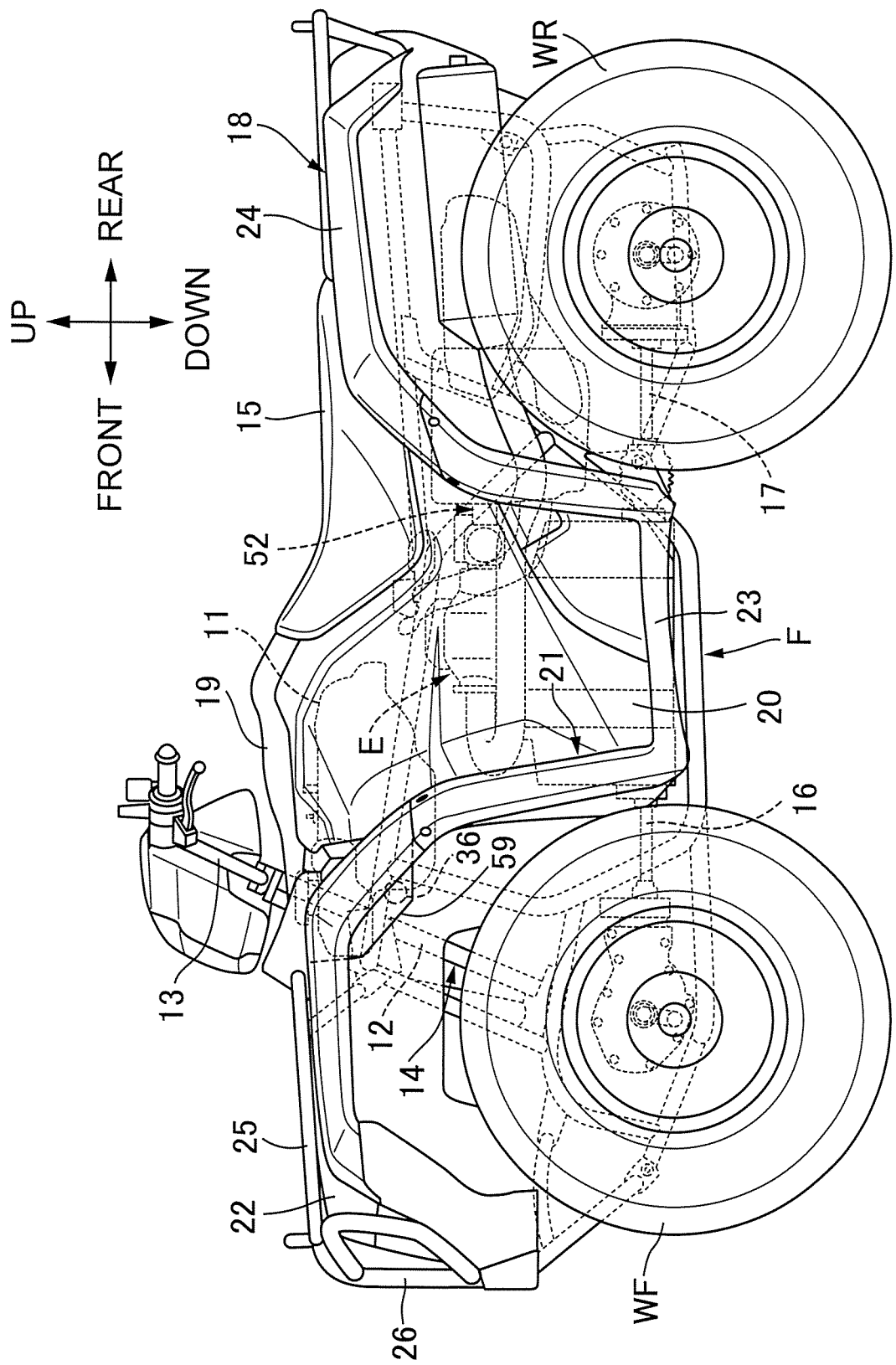
FIG. 9 is a left side view of an all terrain vehicle according to a second embodiment.

As a second embodiment of the present invention, the canister 36 may be accommodated and disposed in the glove box 59 provided on the left-side front fender 21, as illustrated in FIG. 9.

While the embodiments of the present invention have been described above, the invention is not limited to the above embodiments, and various design modifications are possible without departing from the gist of the present invention.

For example, while the canister 36 is attached to the opposite vertical wall section 38a of the case 38 in the aforementioned embodiment, the canister 36 may be attached to the bottom wall section 38b of the case 38.

In addition, while the all terrain vehicle having the pair of left and right front wheels WF and the pair of left and right rear wheels WR has been described in the above embodiment, the present invention is applicable to an all terrain vehicle having a single front wheel and a pair of left and right rear wheels. Further, the canister may be disposed between a rear fender and a rear wheel.

What is claimed is:

1. An all terrain vehicle comprising
an internal combustion engine disposed rearwardly of a steering mechanism,
a fuel tank that reserves fuel which is to be supplied to the internal combustion engine, the fuel tank being disposed above the internal combustion engine,
a body frame on which to mount the internal combustion engine and the fuel tank,
at least three wheels that are suspended at a front portion and a rear portion of the body frame and include at least a pair of left and right wheels, and
a canister for adsorption of evaporated fuel generated in the fuel tank,
wherein
part of a body cover covering at least the body frame, the internal combustion engine and the wheels includes
a vertical wall that extends in an up-down direction while covering a specified wheel of the at least three wheels from either one of front and rear sides,
an upper wall that extends in a front-rear direction while covering the specified wheel from above and is disposed to be spaced toward an other of the front and rear sides from the vertical wall, and
a connection wall that is inclined while interconnecting an end portion on the vertical wall side of the upper wall and an upper end of the vertical wall, and
an accommodation space having a triangular shape as seen in side view is formed between the connection wall and the specified wheel, and the canister is disposed in the accommodation space.

2. The all terrain vehicle according to claim 1, wherein a metallic label is fixed to an upper surface of the connection wall.

3. The all terrain vehicle according to claim 2, wherein the accommodation space as seen in side view is formed by the connection wall an opposite vertical wall section that extends in the up-down direction while being opposed to the connection wall from the other of the front and rear sides, and a bottom wall section that extends in the front-rear direction while being opposed to the connection wall from below, and
the canister is attached to the opposite vertical wall section or the bottom wall section in such a posture that a longitudinal direction of the canister is along a vehicle width direction.

4. The all terrain vehicle according to claim 3, wherein a box-shaped case having a pair of left and right side wall sections in addition to the opposite vertical wall section and the bottom wall section is attached to the body cover while forming the accommodation space between the case and the connection wall, and
at least part of a selected wall section of the opposite vertical wall section, the bottom wall section and the side wall sections can be attached to and detached from the case.

5. The all terrain vehicle according to claim 4, wherein the case is detachably attached to the body cover.

6. The all terrain vehicle according to claim 5, wherein an other of the pair of left and right fenders is provided with a glove box.

7. The all terrain vehicle according to claim 2, wherein a box-shaped case having a pair of left and right side wall sections in addition to an opposite vertical wall section and a bottom wall section is attached to the body cover while forming the accommodation space between the case and the connection wall, and
at least part of a selected wall section of the opposite vertical wall section, the bottom wall section and the side wall sections can be attached to and detached from the case.

8. The all terrain vehicle according to claim 7, wherein the case is detachably attached to the body cover.

9. The all terrain vehicle according to claim 8, wherein
the fuel tank has an oil feeder port disposed at a position deviated toward one of left and right sides from a center in a vehicle width direction of the fuel tank,
the canister is disposed on a side where one of a pair of left and right fenders as said fender is provided, and
an end portion, on a side opposite to the canister, of a conduit is disposed in a vicinity of the oil feeder port, the conduit introducing outside air into the canister.

10. The all terrain vehicle according to claim 2, wherein
the specified wheel is the front wheel that is steered, and
a fender covering the front wheel includes the vertical wall, the upper wall and the connection wall.

* * * * *